United States Patent
Lin

(10) Patent No.: US 12,169,647 B2
(45) Date of Patent: Dec. 17, 2024

(54) METHOD FOR EXTERNAL DEVICES ACCESSING COMPUTER MEMORY

(71) Applicant: SHENZHEN GOUWEIXIN TECHNOLOGY CO., LTD, Guangdong (CN)

(72) Inventor: Kaipeng Lin, Guangdong (CN)

(73) Assignee: SHENZHEN GUOWEIXIN TECHNOLOGY CO., LTD, Guangdong (CN)

( * ) Notice: Subject to any disclaimer, the term of this patent is extended or adjusted under 35 U.S.C. 154(b) by 147 days.

(21) Appl. No.: 17/792,476

(22) PCT Filed: Mar. 25, 2020

(86) PCT No.: PCT/CN2020/081218
§ 371 (c)(1),
(2) Date: Jul. 13, 2022

(87) PCT Pub. No.: WO2021/093249
PCT Pub. Date: May 20, 2021

(65) Prior Publication Data
US 2023/0049427 A1    Feb. 16, 2023

(30) Foreign Application Priority Data

Nov. 13, 2019    (CN) .......................... 201911109177.4

(51) Int. Cl.
*G06F 3/06*    (2006.01)
(52) U.S. Cl.
CPC .......... *G06F 3/0659* (2013.01); *G06F 3/0604* (2013.01); *G06F 3/0673* (2013.01)
(58) Field of Classification Search
CPC .... G06F 3/0659; G06F 3/0604; G06F 3/0673; G06F 12/0292; G06F 12/0223;
(Continued)

(56) References Cited

U.S. PATENT DOCUMENTS

| | | | |
|---|---|---|---|
| 9,804,988 B1 | 10/2017 | Ayoub et al. | |
| 2008/0301256 A1* | 12/2008 | McWilliams | ....... G06F 12/0806 714/E11.178 |

(Continued)

FOREIGN PATENT DOCUMENTS

| | | |
|---|---|---|
| CN | 102521184 A | 6/2012 |
| CN | 104486365 A | 4/2015 |

(Continued)

OTHER PUBLICATIONS

International Search Report of PCT/CN2020/081218, Aug. 13, 2020.

*Primary Examiner* — Jason W Blust
(74) *Attorney, Agent, or Firm* — Locke Lord LLP; Tim Tingkang Xia, Esq.

(57) ABSTRACT

The present invention discloses a method for external devices accessing computer memory, which includes: the external device applying to a computer for a memory space with a certain size, and receiving multiple memory blocks fed back by the computer; the external device establishing a memory mapping relation between the external device and the computer by means of a sequential storage structure or a chain storage structure; and when initiating a read-and-write operation, the external device finding the corresponding offset address in said computer according to the memory mapping relation between the external device and the computer, generating a read-and-write burst command, and actualizing read-and-write operations in the computer memory. The present invention can achieve the rapid and continuous access to multiple discontinuous memory areas of the computer memory, and improve the speed in the computer's operating system and external devices accessing the memory.

11 Claims, 3 Drawing Sheets

(58) Field of Classification Search
CPC .......... G06F 2212/1024; G06F 12/023; G06F 9/5016; Y02D 10/00
See application file for complete search history.

(56) References Cited

U.S. PATENT DOCUMENTS

| | | | |
|---|---|---|---|
| 2009/0077326 A1* | 3/2009 | Motohashi | G06F 12/0692 |
| | | | 711/E12.002 |
| 2016/0077761 A1* | 3/2016 | Stabrawa | G06F 3/0604 |
| | | | 711/172 |
| 2016/0154756 A1* | 6/2016 | Dodson | G06F 13/4022 |
| | | | 710/316 |

FOREIGN PATENT DOCUMENTS

| | | |
|---|---|---|
| CN | 106339258 A | 1/2017 |
| CN | 110019051 A | 7/2019 |

* cited by examiner

METHOD FOR EXTERNAL DEVICES ACCESSING COMPUTER MEMORY

FIELD OF THE INVENTION

The present invention relates to the technical field of data transmission based on PCI-E bus, in particular to a method for external devices such as FPGA accessing computer memory.

BACKGROUND OF THE INVENTION

At present, external devices such as FPGA (Field Programmable Gate Array) communicate with computers mainly through peripheral interfaces such as USB and PCIe, generally by means of the software in computers. With FPGA for instance, if the FPGA needs to share memory with computers, a peripheral device is generally actualized on the FPGA as the peripheral device addressing space of computers, so as to realize computers accessing these zones.

This type of access may be made directly by a CPU, or by a DMA in computers. For example, a memory access space may be provided in the FPGA for the CPU to read out and write in, but this will greatly consume the CPU resources of computers and bring lots of loads to the CPU of computers. However, if the DMA method is adopted in a Linux system, it will be limited by a Linux memory allocation strategy and can only achieve continuous memory allocation for a limited size. Therefore, in the case that the memory is allocated to the access to the peripheral device on the computer, only a small amount of memory space can be actualized. When there is a need for a larger memory space, the intervention of software drivers is required to realize the address information transference between different memory segments, with a relatively low speed.

Moreover, in the prior art, the memory in the FPGA is generally mapped to the memory address space of computers, resulting in a long delay for computers to access this space.

SUMMARY OF THE INVENTION

In order to solve the technical problems, such as only access to a limited continuous memory space in the prior art, the present invention provides a method for external devices accessing computer memory.

The present invention provides a method for external devices accessing computer memory, comprising the following steps:

S1. the external device applying to a computer for a memory space with a certain size, and receiving multiple memory blocks fed back by the computer;

S2. the external device establishing a memory mapping relation between the external device and the computer by means of a sequential storage structure or a chain storage structure; and S3. when initiating a read-and-write operation, the external device finding the corresponding offset address in the computer according to the memory mapping relation between the external device and the computer, generating a read-and-write burst command, and actualizing read-and-write operations in the computer memory.

Specifically, each element of the sequential storage structure or the chain storage structure records the address and size of each memory block and the offset address of the continuous space in the addressing space of the mapped external device, so as to establish the memory mapping relation between the external device and the computer.

S3 further includes:

S3.1. in the case that the memory read-write access device of the external device needs to transmit data, the external device initiating a read operation or a write operation;

S3.2. the external device finding the address of the computer memory block corresponding to the operation address of its addressing space from the sequential storage structure or the chain storage structure, generating a read-and-write operation burst command, and performing read-or-write operations from the position corresponding to the computer memory; and S3.3. sending an interrupt signal to the computer through a PCI-E connection device, so as to inform the computer of a need to receive data.

S3.2 further includes:

in the case of encountering the end of the memory block, ending a burst command, fetching the address of the next memory block from the sequential storage structure or the chain storage structure, generating a burst command of read-and-write operations, performing the read or write operation from the position corresponding to the computer memory until completing transmitting data, then implementing S3.3.

Preferably, the hash algorithm result of the address value of the continuous space in the addressing space of the external device is used as an index of a hash table to find the elements in the sequential storage structure or the chain storage structure corresponding to the operation address by means of the hash table, following the corresponding relation between the elements of the chain storage structure or the sequential storage structure and the value of each index of the hash table.

In a specific example, the sequential storage structure includes an array, and the chain storage structure includes a link list.

In a specific example, the information of the total memory space composed of the memory blocks includes the size and read-write orientation of the total memory space.

Specifically, the computer is connected to the external device through a PCI-E connection device. The processor, the memory and the PCI-E connection device of the computer are connected through an identical memory bus. The PCI-E connection device is connected to the external device through a PCI-E cable or a PCI-E optical cable.

Specifically, in S2, the external device stores the sequential storage structure or the chain storage structure in an allocation memory, and stores the storage address and size of the sequential storage structure or the chain storage structure and the information of the total memory space composed of the memory blocks in an allocation register.

Specifically, the operating system used by the computer is a Linux system or a Windows system.

In the present invention, a continuously accessible memory space composes of the fragmented memory blocks of computer memory by means of the corresponding storage structure, and a corresponding mapping relation is actualized on such an external device that the external device can quickly access the computer memory, so as to achieve the high-speed of the computer's operating system and the FPGA and the sharing of the large-scale memory data.

DETAILED DESCRIPTION OF SOME EMBODIMENTS

The principle and method of the present invention will be described in detail in combination with the figures as follows.

Figure 1:
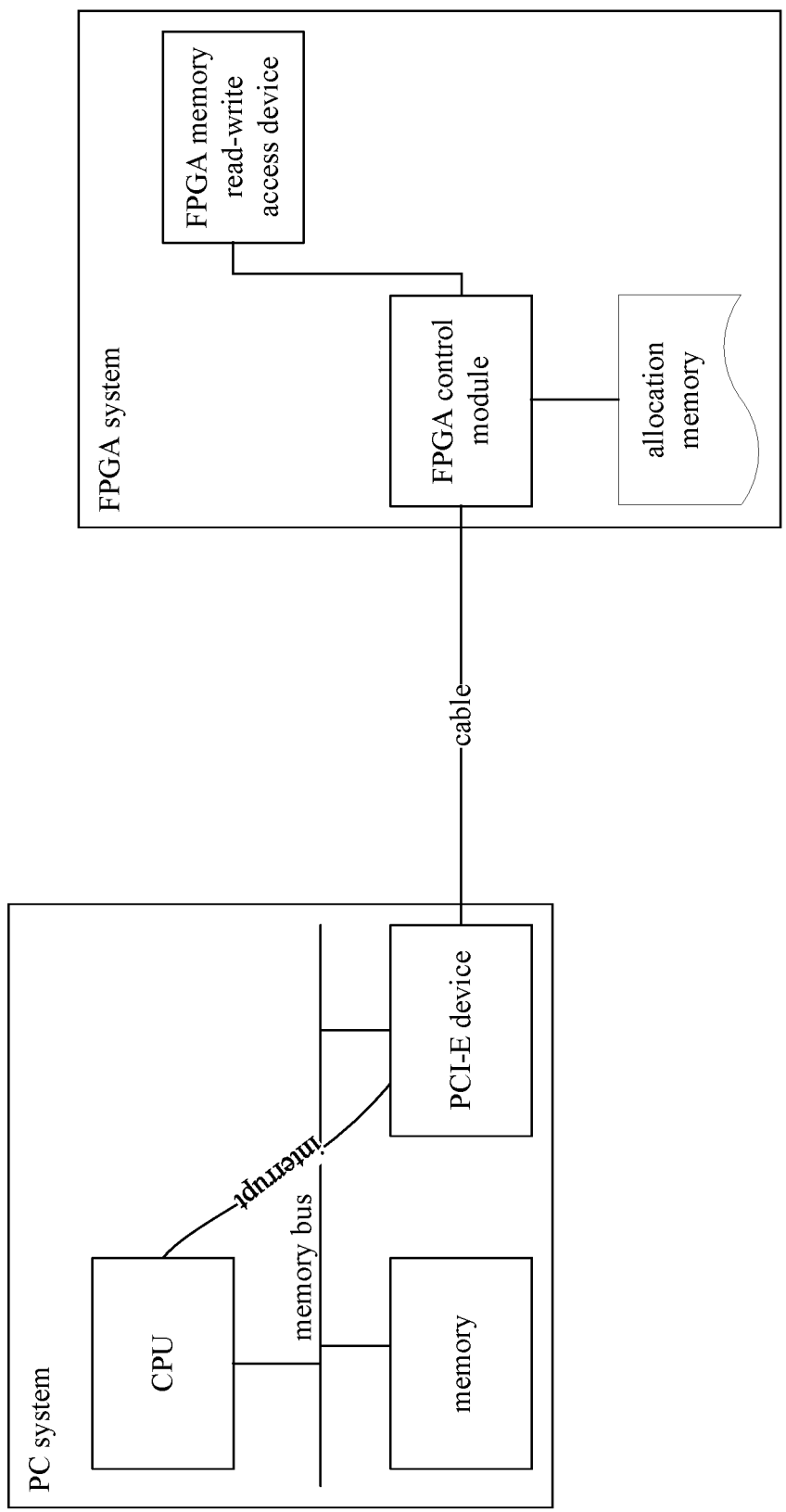
FIG. 1 is a structure diagram of the present invention.

As shown in FIG. 1, the components involved in the computer (ie, PC system) of the present invention in this embodiment include a CPU (processor), a memory bus, a memory, and a PCI-E connection device. The components involved in FPGA include a control module, a memory read-write access device, an allocation memory and an allocation register.

The processor of computers is used to run relatively complex system software, and to receive interrupt signals after the FPGA accesses a memory, without a need to consume resources during the FPGA accessing the memory. The memory bus connects the processor of computers with the memory and the PCI-E connection device, so that the three have a unified addressing space. The PCI-E connection device is a PCI-E interface card connected to the FPGA. In the PC system of computers, it is represented by a PCI-E device, which is connected to the memory bus and connected with the FPGA by a PCI-E cable or a PCI-E optical cable, and which sends an interrupt signal to the processor after the FPGA finishes accessing the memory. Among them, there may be 1 pair, 4 pairs, 8 pairs or 16 pairs of the PCI-E cables.

The control module of the FPGA is connected to the PCI-E connection device of computers by the PCI-E cable or the PCI-E optical cable, having the ability to translate a request of the FPGA's memory to access the memory read-write access device into a request to read and write the memory toward the PC system, according to the list existing in the allocation memory. The allocation memory stores a chain storage structure or a sequential storage structure used for splicing multiple discontinuous memory blocks of computer memory into a continuous memory space, and the allocation register stores the address and size of the chain storage structure or the sequential storage structure, the total size of multiple memory blocks, and the like. In this embodiment, it mainly stores the address of the chain storage structure or the sequential storage structure, but in the preferred embodiment, it stores other information such as the size. The content stored in each element of the chain storage structure or the sequential storage structure includes: (1) an absolute address of computer memory blocks; (2) an size of computer memory blocks, and (3) an offset address of the continuous space of the addressing space of the FPGA corresponding to the memory block obtained by calculation. Of course, it may further include a read-and-write orientation of each memory block, for example, a read orientation or a write orientation, or a read-and-write orientation. The memory read-write access device refers to any device in the FPGA that needs to perform read and write access to the computer memory. The memory read-write access device reading and writing the memory space controlled by the control module of the FPGA is directly mapped by the control module into reading and writing the computer memory.

The above sequential storage structure may adopts an array, and the like, and the chain storage structure may adopts a link list.

In order to find the link list corresponding to multiple memory blocks as fast as possible, the present invention uses a hash table to quickly position the set of elements of the chain storage structure or the sequential storage structure corresponding to the address value of the contiguous space of the FPGA's addressing space. In the present invention, the hash algorithm result of the address value of the continuous space in the addressing space of the external device (such as FPGA) is used as the index of the hash table to find the elements in the sequential storage structure or the chain storage structure corresponding to the operation address by means of the hash table, following the corresponding relation between the elements of the chain storage structure or the sequential storage structure and the address value (ie the operation address) of the addressing space of the external device. That is, with the link list for instance, there are two levels of search relation in the present invention as follows: firstly, to find the corresponding set of link lists through the hash table; secondly, further to find a specific corresponding link list and then find the absolute address of the memory block of computers corresponding to the operation address from this link list. Specifically, the address of the hash table is also stored in the allocation register, and further so does the size of the hash table. In one embodiment, a higher address value of the addressing space of the external device is taken as the input of the hash algorithm from the hash table, and it depends on the fragmentation degree of the memory block of computers, and a higher address beyond the fragmentation degree is taken as the higher address value. For example, if the smallest fragment in a computer memory block is 1 MB, an value above 20 bit is taken as the higher address value. In a specific hash algorithm, several bits can be XORed, for example, for a 32-bit address space, 20 bit~31 bit can be XORed with 3 bits in each group, and done for 4 groups. Then, the result of the hash algorithm is used as the index of the hash table, and the address of the element corresponding to the addressing space of the external device in the mapping table is stored in the link list element within the value of the index. Therefore, in the case that the external device has an operation address in its addressing space accessing the address of a specific memory block of computers, it can firstly search the value corresponding to the index of the hash table, then search the specific link list through the link list group corresponding to the value, next find the address corresponding to the addressing space of computers by the mapping relation in the linked list, that is, the address of the memory block.

In the present invention, if adopting a sequential operation, the hash table can complete address mapping in only 3 cycles, and if hash collision occurs, it needs only 3+7=10 cycles at most. As it is continuous to access the memory space, the probability of the worst hash is not high.

Based on the above structure, the method for FPGA accessing computer memory of the present invention will be described in detail as follows.

Figure 2:
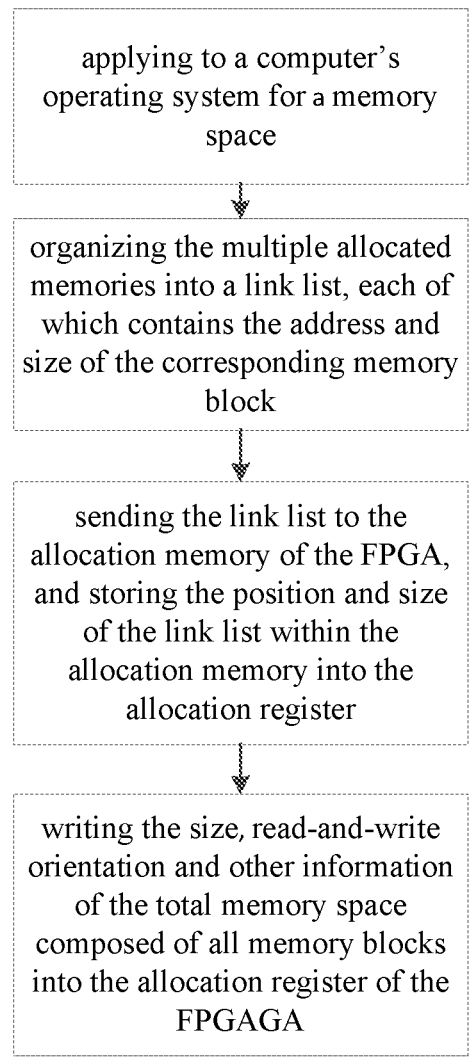
FIG. 2 is a flow chart of the preparation stage of the present invention.

FIG. 2 shows the preparation stage of the present invention, in which the control module of the FPGA applies to the processor of computers for a memory space with a certain size, and receives multiple memory blocks fed back by the computer. The FPGA records the address and size of each memory block by means of an array or a link list, and records the storage address of the array or the link list, and the size and the read-and-write orientation of the total memory space composed of these memory blocks, so as to establish the memory mapping relation between the FPGA and the computer.

Specifically, with the link list for instance, the FPGA stores the link list in the allocation memory, and writes the information such as the storage address and size of the link list, and the total memory space composed of these memory blocks (size and read-and-write orientation) into the allocation register.

When the FPGA initiates a read-and-write operation, it finds the corresponding offset address in the computer according to the memory mapping relation between the FPGA and the computer, generates read-and-write burst commands, and actualizes read-and-write operations in the computer memory.

Figure 3:
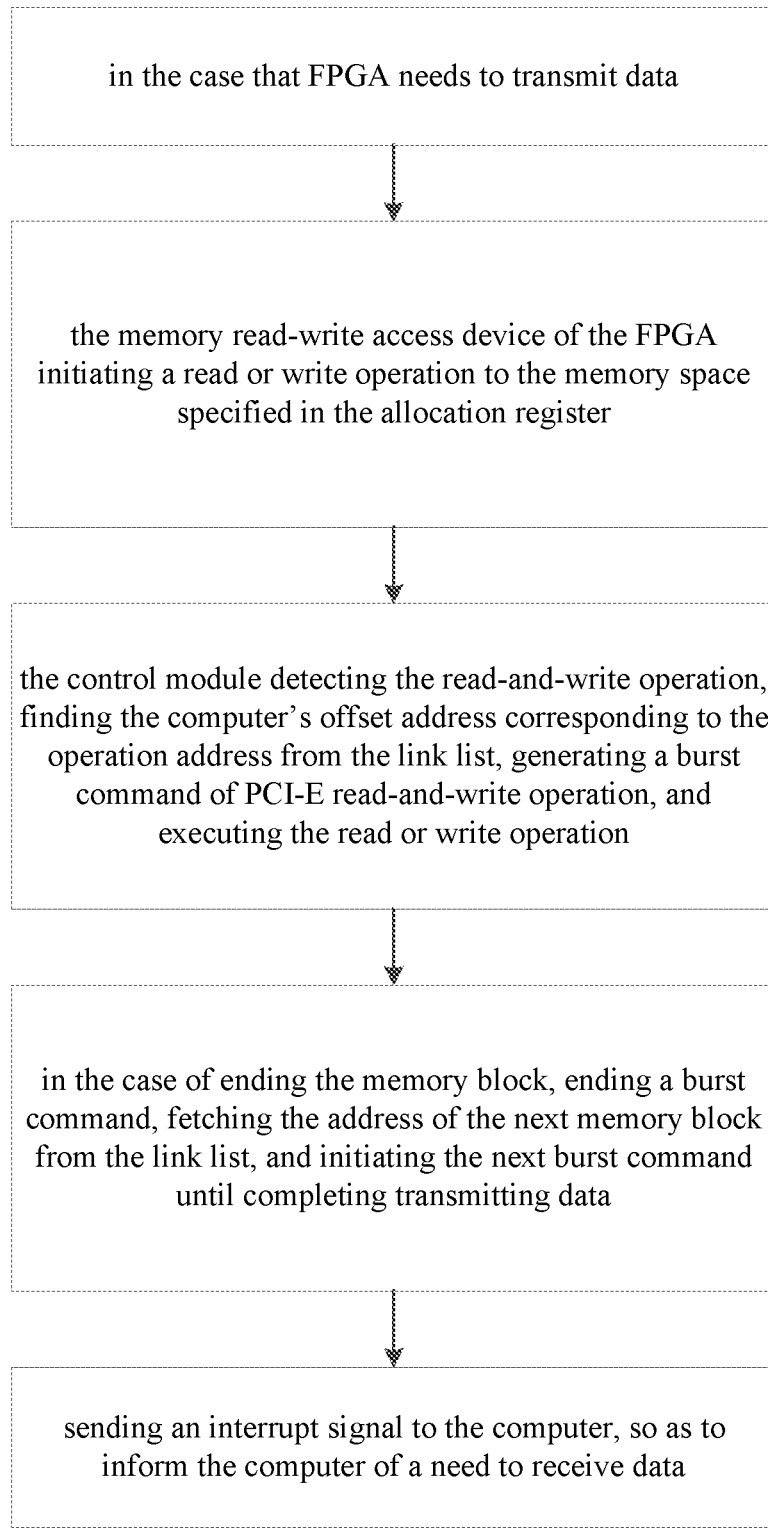
FIG. 3 is a flowchart of the read-and-write operations of the FPGA of the present invention.

As shown in FIG. 3, in the case that any memory read-write access device of the FPGA needs to transmit data, the FPGA initiates a read operation or a write operation through a bus or other modules having the function of data transmission. The control module of the FPGA finds the address of the computer memory block corresponding to the operation address from the link list, generates read-and-write operation burst commands, and performs read-or-write operations from the position corresponding to the computer memory. When encountering the end of the memory block, the control module end a burst command, and fetches the address of the next memory block from the link list, generating a burst command of read-and-write operations, and performing the read or write operation from the position corresponding to the computer memory until completing transmitting data, then sends an interrupt signal to the computer's processor (CPU) through the PCI-E connection device, so as to inform the computer of a need to receive data.

In the above technical solutions of the present invention, the FPGA device can directly access the computer memory, that is, transparently access it, instead of introducing the computer processor, and does not need the computer processor to allocate continuous memory spaces for the FPGA device, so it can be suitable for common LINUX and Windows operating systems. Moreover, the access of the FPGA device to the computer memory does not need to distinguish which is a specific memory block, for the FPGA device, it only needs to be completed like ordinary internal resource access without special operations, increasing the speed in accessing the computer memory. In addition to the FPGA devices listed in this embodiment, the present invention is also applicable to other external devices that need to access the computer memory.

The above specific embodiments are only used to illustrate the structure of the present invention, and a person skilled in the art can make various modifications and changes within the concept of the present invention, and these modifications and changes all fall within the protection scope of the present invention.

What is claimed is:

1. A method for accessing computer memory by an external device, comprising the following steps:
   S1. applying, by said external device, to a computer for a memory space with a certain size, and receiving multiple memory blocks fed back by said computer, wherein the multiple memory blocks are discontinuous memory blocks;
   S2. in response to receiving the multiple discontinuous memory blocks fed back by said computer, splicing, by said external device, the discontinuous memory blocks into a sequential storage structure or a chain storage structure of a continuous memory space, and establishing, by said external device, a memory mapping relation between said external device and said computer by means of the sequential storage structure or the chain storage structure, wherein a hash algorithm result of an address value of the continuous memory space in the addressing space of said external device is used as an index of a hash table to find elements in said sequential storage structure or said chain storage structure corresponding to said operation address by means of said hash table, following the corresponding relation between the elements of said chain storage structure or said sequential storage structure and the value of each index of said hash table; and
   S3. when initiating a read-and-write operation, finding, by said external device, the corresponding offset address in said computer according to said memory mapping relation between said external device and said computer, generating a read-and-write burst command, and actualizing read-and-write operations in said computer memory.

2. The method according to claim 1, wherein each element of said sequential storage structure or said chain storage structure records the address and size of each memory block and the offset address of the continuous space in the addressing space of the mapped external device, so as to establish said memory mapping relation between said external device and said computer.

3. The method according to claim 2, wherein S3 further includes:
   S3.1. in the case that the memory read-write access device of said external device needs to transmit data, initiating, by said external device, a read operation or a write operation;
   S3.2. finding, by said external device, the address of the computer memory block corresponding to the operation address of its addressing space from said sequential storage structure or said chain storage structure, generating a read-and-write operation burst command, and performing read-or-write operations from the position corresponding to the computer memory; and
   S3.3. sending, by said external device, an interrupt signal to said computer through a PCI-E connection device, so as to inform said computer of a need to receive data.

4. The method according to claim 3, wherein S3.2 further includes:
   in the case of encountering the end of said memory block, ending a burst command, fetching the address of the next memory block from said sequential storage structure or said chain storage structure, generating a burst command of read-and-write operations, performing the read or write operation from the position corresponding to the computer memory until completing transmitting data, then implementing S3.3.

5. The method according to claim 1, wherein a higher address value of the addressing space of said external device is taken as the input of the hash algorithm from said hash table.

6. The method according to claim 1, wherein said sequential storage structure includes an array, and said chain storage structure includes a link list.

7. The method according to claim 1, wherein said computer is connected to the external device through a PCI-E connection device.

8. The method according to claim 7, wherein the processor, the memory and the PCI-E connection device of said computer are connected through an identical memory bus.

9. The method according to claim 1, wherein in S2, said external device stores said sequential storage structure or said chain storage structure in an allocation memory, and stores the storage address and size of said sequential storage structure or said chain storage structure in an allocation register.

10. The method according to claim 7, wherein said PCI-E connection device is connected to said external device through a PCI-E cable or a PCI-E optical cable.

11. The method according to claim 1, wherein the operating system used by said computer is a Linux system or a Windows system.

* * * * *